US009551369B2

(12) United States Patent
Koelner

(10) Patent No.: US 9,551,369 B2
(45) Date of Patent: *Jan. 24, 2017

(54) UNIT FIXING INSULATION TO A WALL

(71) Applicant: Koelner Rawlplug IP Sp. z O.O., Wroclaw (PL)

(72) Inventor: Radoslaw Zygmunt Koelner, Wroclaw (PL)

(73) Assignee: Koelner Rawlplug IP Sp. z o.o., Wroclaw (PL)

(*) Notice: Subject to any disclaimer, the term of this patent is extended or adjusted under 35 U.S.C. 154(b) by 120 days.

This patent is subject to a terminal disclaimer.

(21) Appl. No.: 14/411,260

(22) PCT Filed: Jul. 8, 2013

(86) PCT No.: PCT/PL2013/000090
§ 371 (c)(1),
(2) Date: Dec. 24, 2014

(87) PCT Pub. No.: WO2014/011065
PCT Pub. Date: Jan. 16, 2014

(65) Prior Publication Data
US 2015/0176620 A1 Jun. 25, 2015

(30) Foreign Application Priority Data
Jul. 13, 2012 (PL) .......................... 399948

(51) Int. Cl.
F16B 43/00 (2006.01)
F16B 13/12 (2006.01)
(Continued)

(52) U.S. Cl.
CPC ............. F16B 13/124 (2013.01); E04B 1/76 (2013.01); E04B 1/7633 (2013.01); E04F 13/0801 (2013.01)

(58) Field of Classification Search
CPC .......... E04F 13/22; E04B 1/7633; F16B 5/01; F16B 13/124
(Continued)

(56) References Cited

U.S. PATENT DOCUMENTS 3,662,644 A * 5/1972 Flesch .................. F16B 13/124
264/35
4,452,023 A * 6/1984 Stahlberg .............. E04D 3/3603
411/34
(Continued)

FOREIGN PATENT DOCUMENTS

DE 10 2006 042052 A1 3/2007
EP 0 846 878 A2 7/1998
EP 1 693 530 A1 8/2006

Primary Examiner — Gary Estremsky
(74) Attorney, Agent, or Firm — Cherskov Flaynik & Gurda, LLC

(57) ABSTRACT

The object of the invention is a unit fixing insulation to the wall intended both for styrofoam insulation as well as for mineral wool insulation. A unit fixing insulation to a wall, according to the invention, is formed with the locating sleeve which is ended at one end with an expansion zone, and with a circular plate at the other end, whereas the locating sleeve houses an expansion element, preferably in the form of a screw. A unit characterized in that the expansion element has a head embedded permanently in the sleeve with an outer thread and a polygonal hole is provided within the sleeve, and the locating sleeve has a diameter with gradation, wherein a larger diameter is from the inlet side. Length of the locating sleeve from the step to its end is equal to or larger than the length U of the expansion element from the point of being connected to the sleeve to its end, whereas a larger inner diameter of a locating sleeve is larger than the outer diameter of the sleeve fixedly joined to an expansion element. The length of a larger inner diameter of the locating
(Continued)

sleeve is equal to or longer than the length K0 of the sleeve fixedly joined to an expansion element.

3 Claims, 2 Drawing Sheets

(51) Int. Cl.
*E04B 1/76* (2006.01)
*E04F 13/08* (2006.01)

(58) Field of Classification Search
USPC .................................. 411/531, 410; 52/549
See application file for complete search history.

(56) References Cited

U.S. PATENT DOCUMENTS

| | | | | | |
|---|---|---|---|---|---|
| 4,987,714 | A | * | 1/1991 | Lemke | E04D 3/3603 411/369 |
| 5,069,589 | A | * | 12/1991 | Lemke | E04D 5/145 411/160 |
| 5,171,118 | A | * | 12/1992 | Rothenbuhler | E04B 1/762 411/480 |
| 5,378,102 | A | * | 1/1995 | Mossman | B25B 21/002 227/140 |
| 6,308,483 | B1 | * | 10/2001 | Romine | E04D 3/3603 411/383 |
| 7,320,179 | B2 | | 1/2008 | Tiemann | |
| 2005/0055927 | A1 | * | 3/2005 | Tiemann | B23B 49/005 52/459 |
| 2008/0085168 | A1 | * | 4/2008 | Cabrele | F16B 13/001 411/22 |
| 2011/0008124 | A1 | * | 1/2011 | Niklewicz | B25B 31/005 411/80.6 |

\* cited by examiner

UNIT FIXING INSULATION TO A WALL

CROSS REFERENCE TO RELATED APPLICATIONS

This application claims the benefit as a US Nationalization of PCT application Ser. No. PCT/PL2013/000090 filed on Jul. 8, 2013, published as WO/2014/011065 on Jan. 16, 2014, which in turn claimed priority to a Polish Patent Application serial number, P.399948, filed on Jul. 13, 2012, the contents of which are hereby incorporated by reference.

BACKGROUND OF THE INVENTION

1. Field of the Invention

The object of the invention is a unit fixing insulation to the wall intended both for styrofoam insulation as well as for mineral wool insulation.

2. Background of the Invention

U.S. Pat. No. 7,320,179 discloses a unit fixing insulation to a wall. This unit is formed by a pressing plate with a shaft, which houses a sleeve locating pin which is ended with an expansion zone. A locating pin houses an expansion element in the form of a steel screw with a head at one end and a thread at the other, i.e. from the side inserting in the locating pin, in particular within its expansion zone. The head of the expansion element is adapted for receiving a tip of a drill or drill-screwdriver, which allows screwing the threaded portion of the expansion element in the locating pin expansion zone. A hexagonal nut, to which a metal shield is welded, is applied onto the tip of the drill, wherein the metal shield is positioned at a predetermined distance from the nut, and is connected to it through the shoulders. While the drill tip rotates, the hexagonal nut engages the seat of the pressing plate causing also the rotation of the pressing plate, whose edges are provided with teeth. Teeth of the pressing plate are cutting the insulation until the metal shield rests against the insulation. As a result, a cavity is formed between the outer surface of the pressing plate and the outer surface of the insulation, which has to be provided with additional insulation fitting.

German patent specification DE 10 2006 042 052 also discloses a unit fixing insulation to a wall. This unit is formed by a pressing plate connected with a locating pin which ends with an expansion zone. A locating pin houses an expansion element in the form of a steel screw. A circular insulating fitting with slits in the centre is attached to the pressing plate. The fixing unit is inserted in the previously drilled hole, where after a long drill tip is inserted through the circular fitting slits into the locating pin hole. Drill rotations cause screwing of the expansion element into the expansion zone of the locating pin.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

Figure 1:
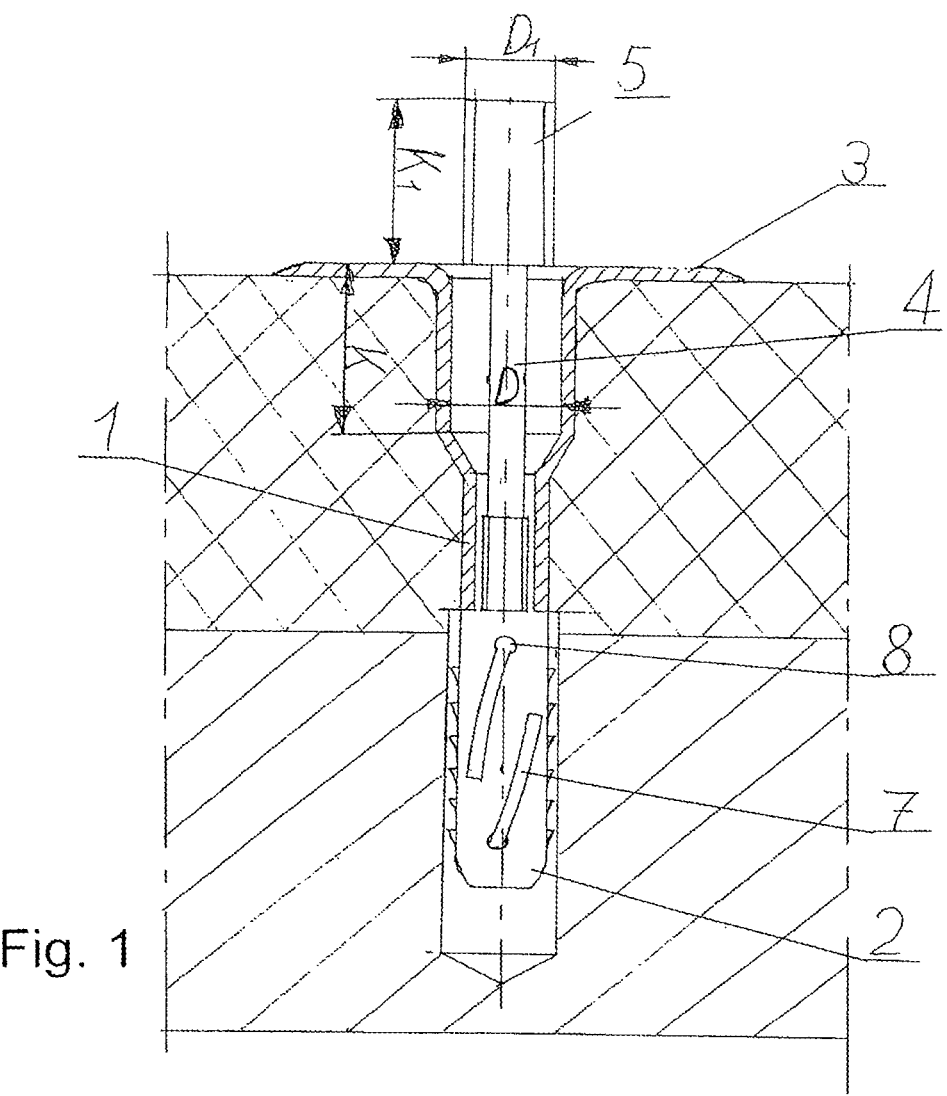
FIG. 1 depicts a cross-section of an embodiment of the invention.

The foregoing summary, as well as the following detailed description of certain embodiments of the present invention, will be better understood when read in conjunction with the appended drawings.

A unit fixing insulation to a wall, according to the invention, is formed with the locating sleeve which is ended at one end with an expansion zone and with a circular plate at the other end, whereas the locating sleeve houses an expansion element, preferably in the form of a screw. A unit according to the invention, characterised in that the expansion element has a head embedded permanently in the sleeve with an outer thread and a polygonal hole is provided within the sleeve. The locating sleeve has a diameter with gradation, wherein a diameter is larger from the inlet side, wherein the length L2 of the locating sleeve from the step to its end is equal to or larger than the length Li of the expansion element from the point of being connected to the sleeve to its end. Whereas, a larger inner diameter of a locating sleeve is larger than the outer diameter of the sleeve fixedly joined to an expansion element, wherein the length of a larger inner diameter of the locating sleeve is equal to or longer than the length of the sleeve fixedly joined to an expansion element. The end of a locating sleeve has a ribbed outer surface and slitted on both sides, wherein the outermost slits are ended with a circular opening.

A unit fixing insulation to a wall, according to the invention, is characterised by a simple structure and yet a preferred functionality. Application of the unit for fixing the insulation to the wall will cause not only its durable attachment but also its additional advantage is that the fixing is fast, because fixing the unit is obtained during one short operation. Having performed preparatory activities involving drilling the hole and inserting the fixing unit into the hole, a drill tip of the drill-screwdriver is inserted into the hole of the sleeve fixedly joined to an expansion element and after a few rotations of the drill-screwdriver an insulation is fixed to the wall and the wall section is insulated flush with the entire insulation. Simultaneous fixing of the insulation in the form of the fixing unit does not create a thermal bridge, what might cause a heat loss and additionally prevents penetrating of moisture. Using a special sleeve attached onto the head of the fixing element causes insulating a metal fixing element from the outer surface, which eliminated the thermal bridge, through which the heat could pass to the outside of the wall insulation and the shape of this sleeve seals the connection against penetrating of moisture. At the same time the shape of the sleeve allows the use of drill-screwdriver for fixing the fixing unit. Ending the slits with a circular opening causes significant weakening of the cross-section of the locating sleeve, additionally choice of mutual lengths of the expansion element and the locating sleeve and its gradation creates the conditions so that while screwing the expansion element, part of the locating sleeve is compressed, which in turn allows free insulation compressing without the need to move the whole locating sleeve.

Figure 2:
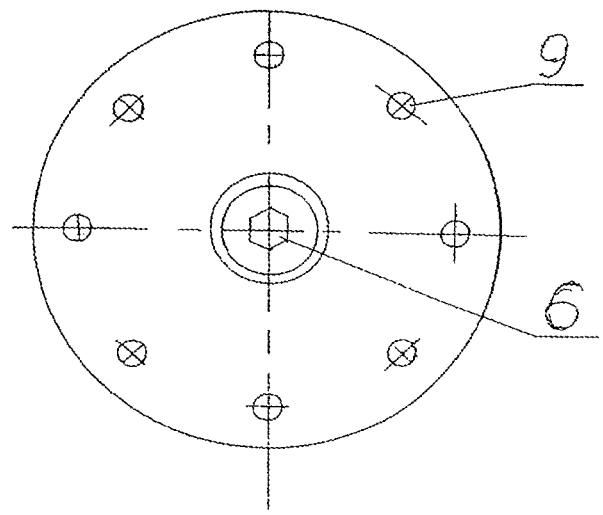
FIG. 2 depicts a top view of an embodiment of the invention.
Figure 3:
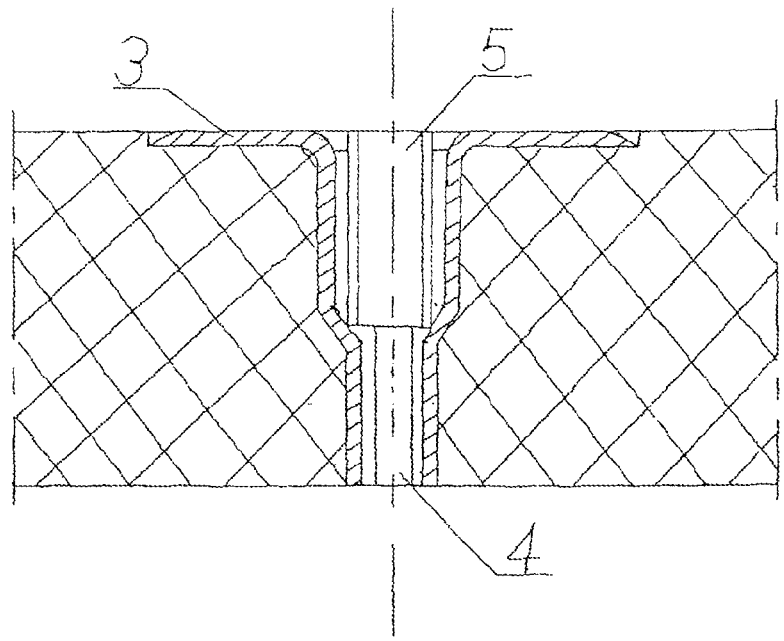
FIG. 3 shows a partial view of an embodiment of the invention.
Figure 4:
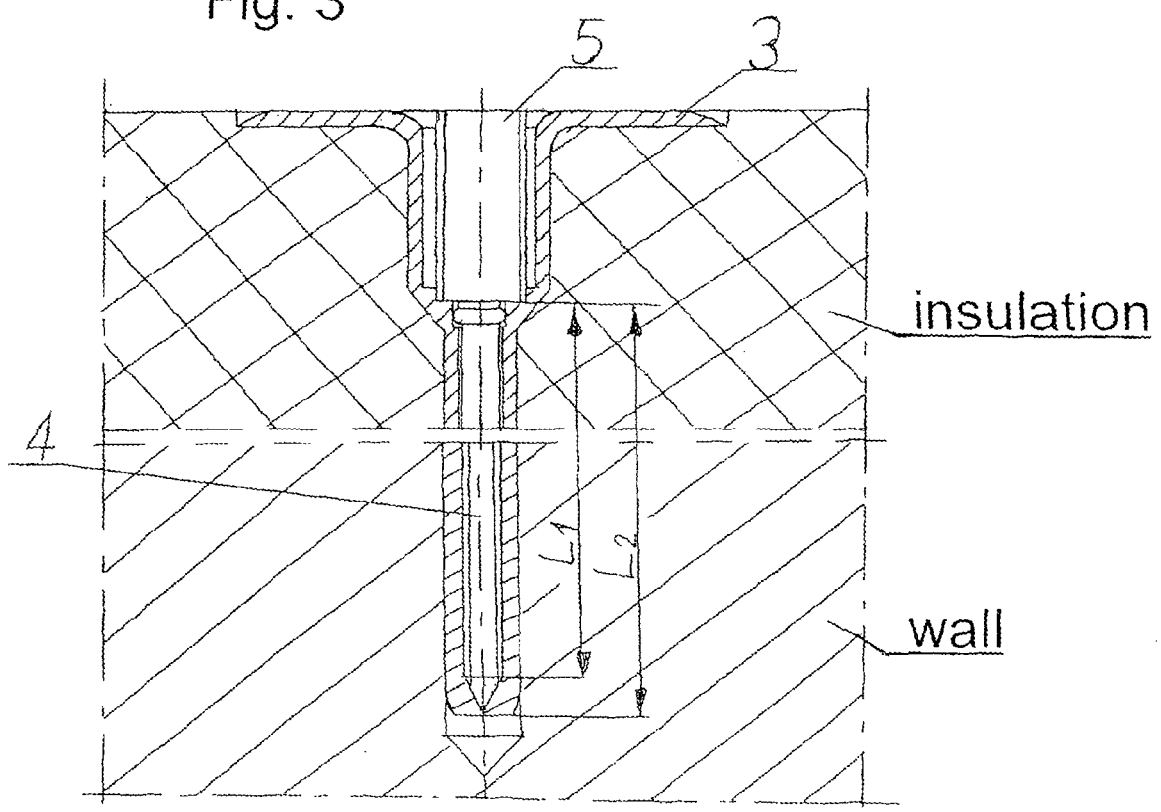
FIG. 4 depicts an embodiment of the invention as fixed in wall insulation.

The unit fixing insulation to the wall, according to the invention is described in more details in the embodiment and the drawing, in which FIG. 1 shows a cross-section through the fixing unit located in the opening and prepared for being fixed in the insulation, FIG. 2 is the top view of the unit shown in FIG. 1, whereas FIG. 3 shows a fragment of the unit fixed in the insulation, while FIG. 4 shows a variation of the unit fixed in the insulation and the wall.

As it is illustrated in FIG. 1 to FIG. 4, the unit fixing insulation to the wall is formed with the locating sleeve 1 which is ended at one end with the expansion zone 2, while at the other end with the circular plate 3. The locating sleeve 1 houses an expansion element 4, in the form of a screw. The expansion element 4 has a head embedded permanently in the sleeve 5 with an outer thread and a polygonal hole 6 is provided within the sleeve 5. A locating sleeve 1 has a diameter with gradation, wherein a larger diameter is from the inlet side. A larger inner diameter D of a locating sleeve 1 is larger than the outer diameter Di of the sleeve 5 fixedly joined to an expansion element 4. The length of a larger inner diameter D of the locating sleeve 1 equals the length of the sleeve 5 fixedly joined to an expansion element 4. The end of a locating sleeve 1 in the form of the expansion zone 2 has a ribbed outer surface and slitted on both sides, wherein the outermost slits 7 are ended with a circular opening 8 which causes significant weakening of the cross-section of the locating sleeve 1, so that at this weakened place the locating sleeve 1 is expanded while screwing the expansion element 7 into it. Holes 9 are made in the circular plate 3, along the entire circumference of a plate 3.

The locating sleeve 1 is inserted into the hole, previously made in the insulation and the wall, then the expansion element 4 is inserted within the locating sleeve 1, while a drill tip of the drill-screwdriver is inserted into the sleeve 5 fixedly joined to an expansion element and in particular to its profiled polygonal hole 6. Switching on the drill-screwdriver the expansion element rotates and moves along the locating sleeve 1. In the final phase, a locating part of the sleeve 1 moves together with the circular plate 3, causing pressing of the circular plate 3 into the insulation, while the expansion zone 2 is partially compressed. A circular plate 3 and a sleeve 5 are positioned at the insulation level which facilitates laying the subsequent wall decorative layers, and at the same time two elements form the insulation, so that there are no thermal bridges which might cause a loss of heat as shown in FIG. 3 and FIG. 4.

The embodiment of the invention in which an exclusive property or privilege is claimed is defined as follows:

1. A unit for attaching insulation to a wall, comprising:
   a main body formed with a locating sleeve which is ended at one end with an expansion zone, and with a circular plate at an opposing end;
   wherein the locating sleeve houses an expansion element;
   wherein the expansion element defines a head embedded permanently in an expansion element sleeve with an outer thread and wherein said expansion element sleeve is directly joined with the expansion element;
   wherein said expansion element sleeve defines a polygonal hole; and
   wherein the locating sleeve has a variable diameter, wherein a larger first diameter is from the inlet side;
   wherein a length of the locating sleeve from a step to its end is equal to or larger than a length of the expansion element measured from connection to said expansion element sleeve to an end of the expansion element;
   whereas a larger inner diameter of the locating sleeve is larger than the outer diameter of the expansion element sleeve fixedly joined to an expansion element;
   wherein the length of a larger inner diameter of the locating sleeve is equal to or longer than the length of the expansion element sleeve fixedly joined to an expansion element.

2. A fixing unit according to claim 1, wherein the end of the locating sleeve comprises a ribbed outer surface slitted on both sides, wherein outermost slits are ended with circular openings.

3. The unit fixing insulation to a wall of claim 1 wherein the expansion element comprises a screw.

* * * * *